US008417667B1

(12) United States Patent
Lefevre et al.

(10) Patent No.: US 8,417,667 B1
(45) Date of Patent: Apr. 9, 2013

(54) RUNNING COMMANDS ON FILES USING FILENAME EXTENSIONS TO OVERLOAD OPERATIONS

(75) Inventors: Ryan Lefevre, Sunnyvale, CA (US);
Balemurughan Kumaresan, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/286,183

(22) Filed: Oct. 31, 2011

(51) Int. Cl.
*G06F 7/00* (2006.01)
*G06F 17/00* (2006.01)
(52) U.S. Cl. ........................................ 707/609
(58) Field of Classification Search .................. None
See application file for complete search history.

(56) References Cited

U.S. PATENT DOCUMENTS

| | | | | |
|---|---|---|---|---|
| 5,913,028 A | * | 6/1999 | Wang et al. | 709/203 |
| 6,718,372 B1 | * | 4/2004 | Bober | 709/217 |
| 2009/0103902 A1 | * | 4/2009 | Matsuura et al. | 386/124 |
| 2011/0125806 A1 | * | 5/2011 | Park | 707/803 |

OTHER PUBLICATIONS

Kleiman, Vnodes: An Architecture for Multiple File System Types in Sun UNIX, 1986, University of Omaha, USENIX Summer, pp. 1-10.*

* cited by examiner

*Primary Examiner* — Pierre Vital
*Assistant Examiner* — Taelor Kim
(74) *Attorney, Agent, or Firm* — Brill Law Office; Jeffrey Brill (57) ABSTRACT

A client without direct access to a server performs commands on files of the server's file system, wherein the file system is made available by a network file system protocol. Calls to access the file system on the server are filtered. A call is identified that is passed a parameter comprising a filename with an identifiable filename extension. The identifiable filename extension is interpreted as indicating that the identified call was made as part of an attempt to execute an operation that is overloaded with a different command. It is determined, from the identifiable filename extension, which command is to be executed instead of the operation. Once the command to be executed is determined, the filename extension is removed from the parameter, and the determined command is executed instead of the overloaded operation.

18 Claims, 4 Drawing Sheets

RUNNING COMMANDS ON FILES USING FILENAME EXTENSIONS TO OVERLOAD OPERATIONS

TECHNICAL FIELD

This disclosure pertains generally to computer storage, and more specifically to running commands on files using filename extensions to overload operations.

BACKGROUND

Network File System (NFS) is a network file system protocol that makes files on a server accessible from a client over a network. NFS utilizes a server component and a client component. It is sometimes desirable to be able to run commands directly on files on a server from a client. Conventionally, to run a command on a file that is being served to a client over NFS, the command has to be run directly on the server, or sent over a secondary protocol, such as secure shell (SSH). Therefore, it is necessary under conventional NFS for a user to have direct access to the server in order to run commands on files being served over NFS. This limits the usefulness of an NFS environment.

It would be desirable to address these issues.

SUMMARY

A user on a client without direct access to a server is enabled to perform commands on files of the server's file system, wherein the file system is made available to the client by a network file system protocol such NFS. Calls to access the file system on the server are filtered. This can be done, for example by a component of the file system driver, by a file system filter driver or by intercepting system calls targeting the file system. Calls to access the file system are passed one or more parameters. A call is identified that is passed a parameter comprising a filename with an identifiable filename extension. As identifiable filename extension comprises a filename extension in the format of the file system, wherein the content of the identifiable filename extension indicates that an operation to which the parameter is being passed is overloaded with a different command. The identifiable filename extension is interpreted as indicating that the identified call was made as part of an attempt to execute an operation that is overloaded with a different command, such that the different command is to be executed instead of the operation.

It is determined, from the identifiable filename extension, which command is to be executed instead of the operation. This can comprise parsing the identifiable filename extension and isolating either the name of the command or an identifier of the command in the identifiable filename extension. Once the command to be executed is determined, the identifiable filename extension is removed from the parameter, and the determined command is executed instead of the overloaded operation. The determined command is passed the one or more parameters passed to the identified call, after the identifiable filename extension has been removed. This works because the operation that is overloaded and the command that the operation is overloaded with both take the same number of parameters. The attempt to execute the operation that is overloaded with a different command originates from the client without direct access to a server. More specifically, a component of the network file system protocol on the server receives a request to execute the operation from a component of the network file system protocol on the client.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
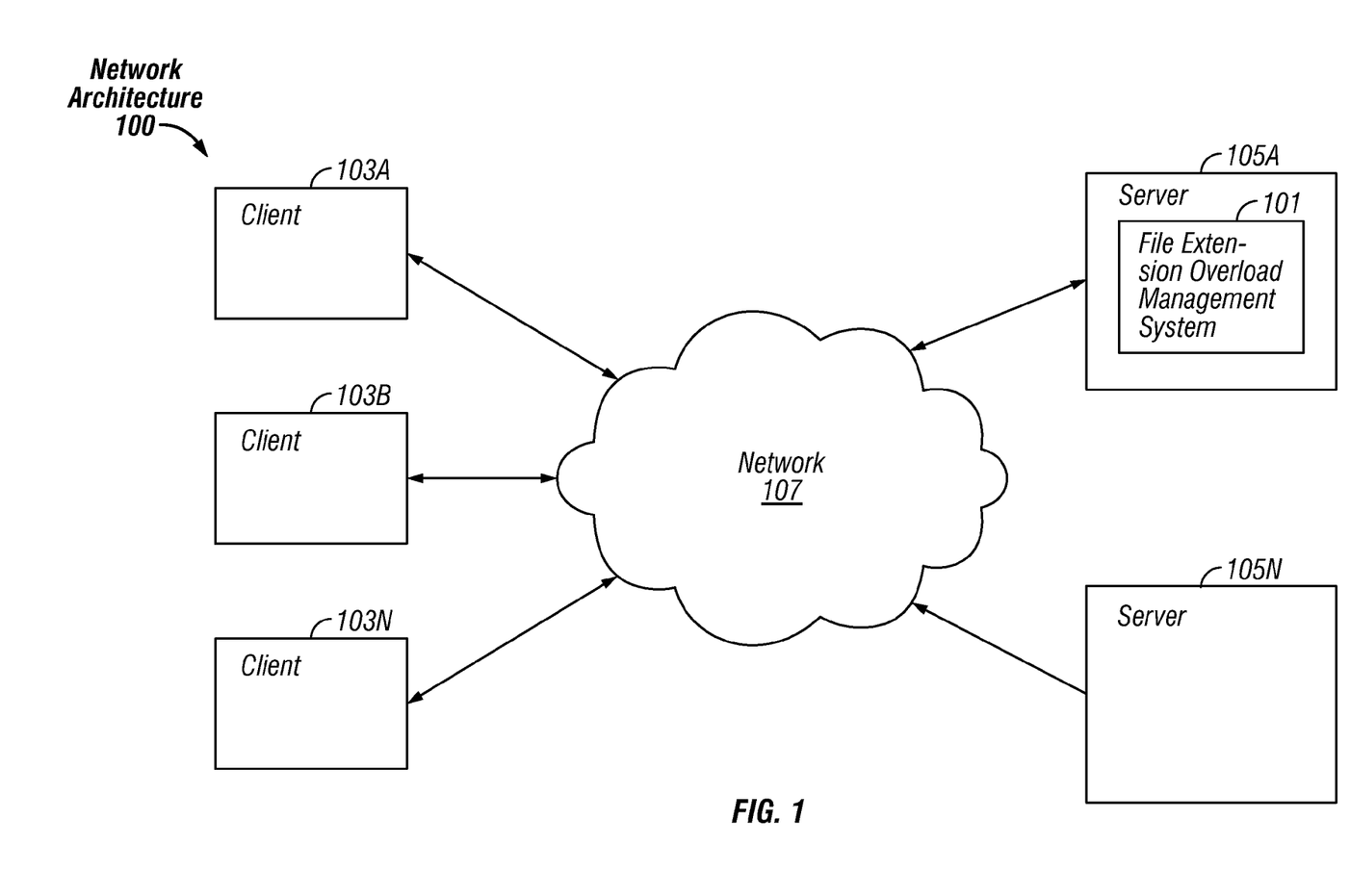
FIG. 1 is a block diagram of an exemplary network architecture in which a file extension overload management system can be implemented, according to some embodiments.

FIG. 1 is a block diagram illustrating an exemplary network architecture 100 in which a file extension overload management system 101 can be implemented. The illustrated network architecture 100 comprises multiple clients 103A, 103B and 103N, as well as multiple servers 105A and 105N. In FIG. 1, the file extension overload management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
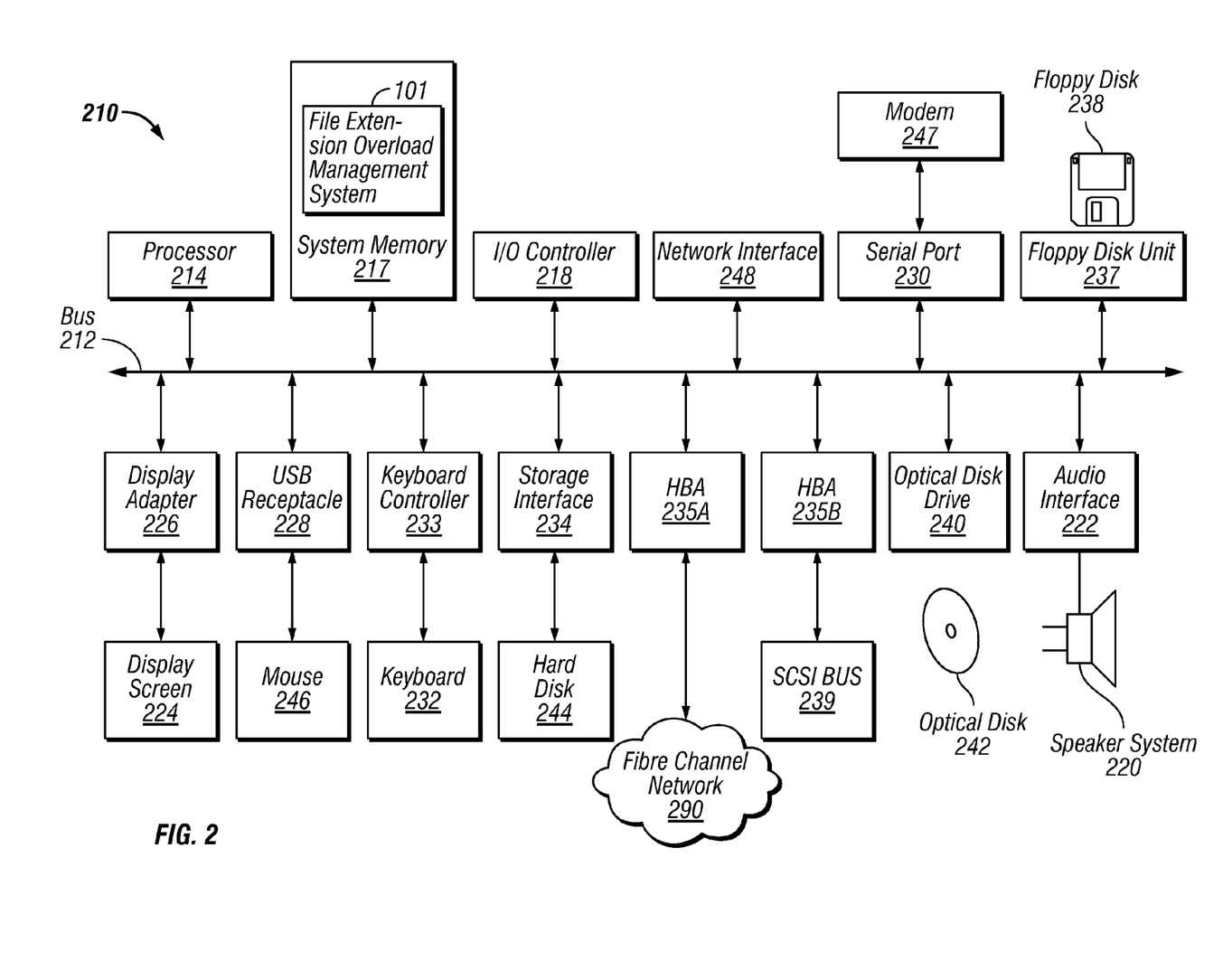
FIG. 2 is a block diagram of a computer system suitable for implementing a file extension overload management system, according to some embodiments.

FIG. 2 is a block diagram of a computer system 210 suitable for implementing a file extension overload management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the file extension overload management system 101 is illustrated as residing in system memory 217. The workings of the file extension overload management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
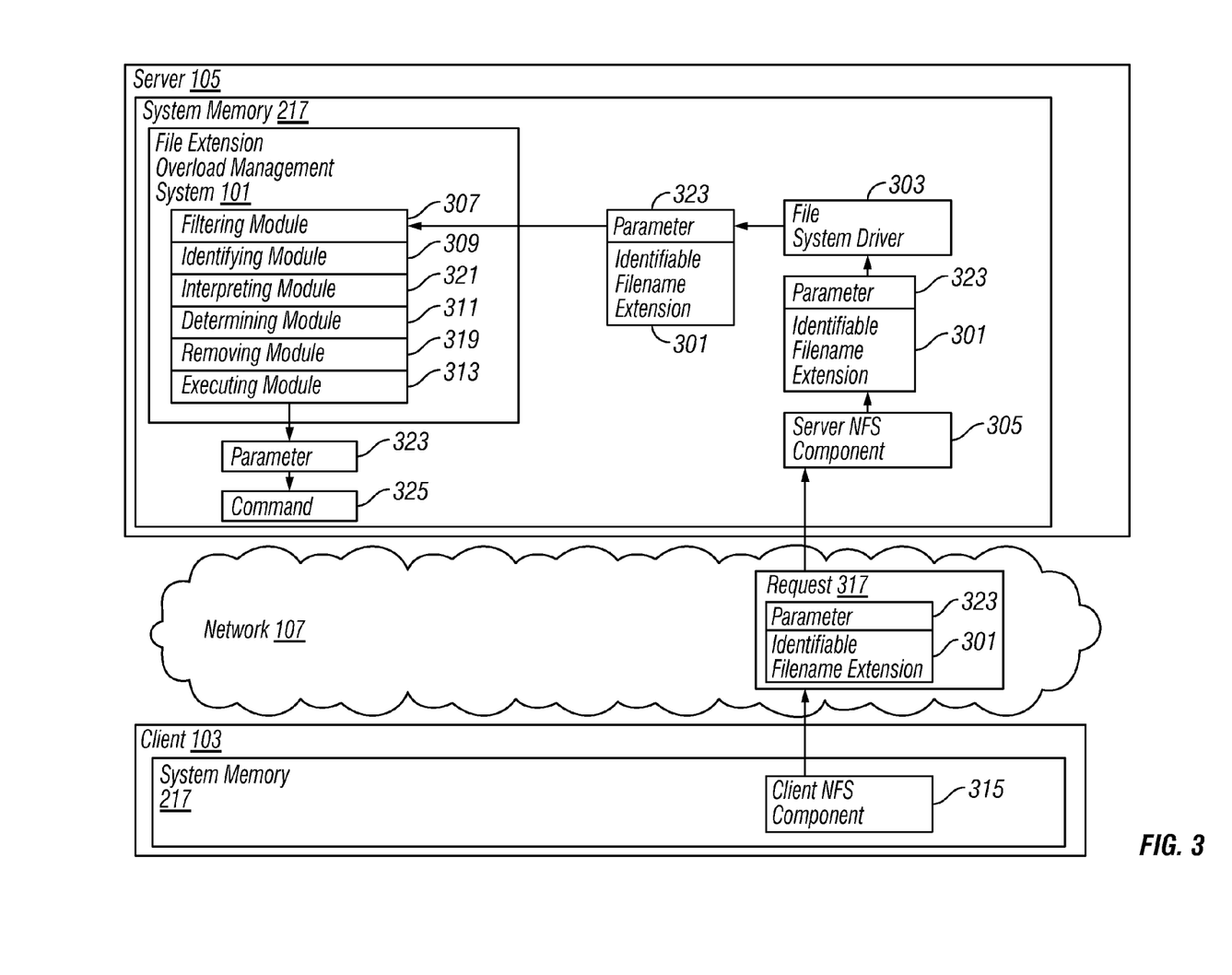
FIG. 3 is a block diagram of the operation of a file extension overload management system, according to some embodiments.

FIG. 3 illustrates the operation of a file extension overload management system 101 residing in the system memory 217 of a computer 210, according to some embodiments. As described above, the functionalities of the file extension overload management system 101 can reside on a server 105, a client 103, or be distributed between multiple computer systems 210, including within a cloud-based computing environment in which the functionality of the file extension overload management system 101 is provided as a service over a network 107. It is to be understood that although the file extension overload management system 101 is illustrated in FIG. 3 as a single entity, the illustrated file extension overload management system 101 represents a collection of functionalities, which can be instantiated as a single or multiple modules as desired (an instantiation of specific, multiple modules of the file extension overload management system 101 is illustrated in FIG. 3). It is to be understood that the modules of the file extension overload management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the file extension overload management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a file extension overload management system 101 overloads specific NFS operations to allow commands 325 to be run directly on files on a server 105, from a client 103, without modifying NFS. To do so, the file extension overload management system 101 uses NFS file system operations that take at least one filename as a parameter 323, and overloads them to run specific commands 325 instead of the normal operations. An identifiable filename extension 301 is appended to the end of a filename passed to the NFS operation that is being overloaded. The fact that an identifiable filename extension 301 is appended to the parameter 323 indicates to the file extension overload management system 101 that the operation is overloaded.

An identifiable filename extension 301 can be in the form of any filename extension in the format of the file system being served by NFS, wherein the identifiable filename extension 301 is unambiguously identifiable as indicating that the operation to which the filename with the identifiable filename extension 301 is passed is overloaded with a specific command 325. The identifiable filename extension 301 is interpreted by NFS as simply being part of the filename. Thus, NFS proceeds to attempt to execute the operation with the parameters 323 it was passed, including the filename. In the process of attempting to execute the operation, NFS attempts to perform operations on the file system that NFS is serving over the network 107. This results in calls being made to the file system driver 303 to perform file system services. The file extension overload management system 101 filters calls made for file system services, and recognizes when the file system driver 303 has been called to perform an operation with a parameter 323 comprising a filename with an identifiable filename extension 301. The file extension overload management system 101 interprets the parameter 323 with the identifiable filename extension 301 as an indication that the operation in question is overloaded, and thus that a different command 325 should be executed instead of the operation. The file extension overload management system 101 proceeds to determine the command 325 with which the operation is overloaded, and then executes that command 325 instead of the NFS operation. Because the file extension overload management system 101 is running on the server 105, it can execute commands 325 directly on files being served by NFS. However, the overloading of NFS operations allows this to occur without NFS itself being modified. As a result, an overloaded NFS operation requested by a client 103 can initiate the running of a command 325 on a file on a server 105, where the server's file system is being served by NFS over a network 107.

Describing this functionality in greater detail, a server NFS component 305 provides clients 103 with access to the file system on the server 105 over the network 107. Note that although only a single client 103 is illustrated in FIG. 1, in practice many clients 103 could access the file system on the server 105 via NFS. A client NFS component 315 on the client 103 makes requests 317 for NFS operations to be performed on files on the server 105. These requests 317 are processed by the server NFS component 305. In the process of processing the requests 317 to serve the server's file system over the network 107, the server NFS component 305 attempts to perform various supported operations (e.g., create, link, etc.) on files. This results in calls being made to the file system driver 303, with the appropriate parameters 323 for the operations. A filtering module 307 of the file extension overload management system 101 filters calls made for file system services, for example by filtering the file system driver 303. The filtering module 307 can be implemented in different ways in different embodiments. In some embodiments, the filtering module 307 as instantiated as a component of the file system driver 303 itself. In other embodiments, the filtering module 307 is instantiated as a file system filter driver, or by intercepting system calls targeting the file system. In any case, the filtering module 307 can monitor calls for file system services (e.g., at a file system driver 303 level), and either allow the calls to proceed unmodified, or call code to perform other functionality instead of or in addition to the called file system services.

Because calls to perform file system services are filtered, an identifying module 309 of the file extension overload management system 101 is able to identify calls to the file system driver 303 that pass a parameter 323 in the form of a filename with an identifiable filename extension 301. An interpreting module 321 of the file extension overload management system 101 interprets an identifiable filename extension 301 as an indication that a call is being made to an overloaded operation. Therefore, the filtering module 307 does not return control to the code to perform the operation unmodified according to the call from the server NFS component 305. Instead, a determining module 311 of the file extension overload management system 101 determines what command 325 is to be performed based on the passing of the parameter 323 with the identifiable filename extension 301 to the particular operation. In other words, the determining module 311 determines with what command 325 the operation in question is overloaded. An executing module 313 of the file extension overload management system 101 proceeds to execute that command 325. The operations of the determining module 311 and the executing module 313 are discussed in detail below.

In order to determine with what command 325 an operation is overloaded, the determining module 311 examines the identifiable filename extension 301 which indicates that the operation being attempted is overloaded with another command 325. In some embodiments, the identifiable filename extension 301 includes or comprises the name of the command 325 itself. In such embodiments, the determining module 311 parses the identifiable filename extension 301 so as to isolate the command 325 name, and from the isolated command 325 name determines the command 325 to be executed. In other embodiments, the identifiable filename extension 301 includes or comprises an identifier of the command 325, which can be used to look up the command 325, for example in a table. In those embodiments, the determining module 311 parses the identifiable filename extension 301 so as to isolate the identifier of the command 325, and then uses the identifier to determine the command 325 to be run. It is to be understood that in different embodiments, the determining module 311 is configured so as to correctly isolate the command 325 or command identifier from the identifiable filename extension 301, based on the specific format of the identifiable filename extension 301 in use. The determining module 311 is further configured so as to determine the command 325 to be executed in place of the called operation based on the command 325 or command identifier isolated from the identifiable filename extension 301. It is to be further understood that identifiable filename extensions 301 are in the format of filename extensions 301 in the file system in use, such that NFS interprets them as extensions of filenames passed to NFS as parameters 323 for operations. However, the content of an identifiable filename extension 301 is such that it can be unambiguously interpreted by the file extension overload management system 101 as indicating that the operation that was passed the parameter 323 with the specific identifiable filename extension 301 is overloaded with a specific command 325.

Once the determining module 311 has determined which command 325 is to be run in place of the overloaded operation, the executing module 313 executes the desired command 325 with the parameters 323 that were passed to the overloaded operation. Before executing the desired command 325 and passing it the parameters 323, a removing module 319 of the file extension overload management system 101 removes the identifiable filename extension 301 from the parameter 323 to which it is appended. This is the case because the identifiable filename extension 301 is not actually part of the parameter 323 to be passed to the command 325, but instead an indication that the called operation is overloaded with the command 325. It is to be understood that operations are overloaded with commands 325 that take the same number of parameters 323, and thus the parameters 323 passed to the operation can simply be passed to the command 325, once the identifiable filename extension 301 has been removed from the parameter 323 to which it was appended.

Thus, a user on a client 103 can trigger the execution of a command 325 on the server 105 with a set of parameters 323 by using the client NFS component 315 to request an overloaded NFS operation on the server 105. More specifically, the user directs NFS to perform an operation that is overloaded with the desired command 325. The user passes NFS the parameters 323 for the command 325, with the appropriate identifiable filename extension 301 appended to the appropriate parameter 323 to indicate to the file extension overload management system 101 on the server 105 to execute the command 325, not the actual NFS operation. The client NFS component 315 makes the request 317 for the NFS operation to be performed on the file(s) on the server 105, with the parameters 323. The request 317 is processed by the server NFS component 305, which results in the executing component 313 executing the command 325 with which the operation is overloaded. The executing component 313 executes the command 325 with the same parameters 323, passed in the same order, as were originally passed to NFS, except with the identifiable filename extension 301 removed from the parameter 323 to which it was appended.

Because NFS operations are overloaded with commands 325 that take the same number of parameters 323, the above-described functionality works. The user directs NFS to perform an overloaded command 325, with a set of parameters 323 passed to NFS in the order in which the user wants the parameters 323 passed to the command 325. The identifiable filename extension 301 is removed from its parameter 323, and the command 325 is executed with the desired parameters 323 passed in the correct order. Note that the because the file extension overload management system 101 has server level access to the file system being served by NFS, the executing module 313 can execute the desired command 325 directly on file(s) under the server's file system, even though the NFS operation that triggers the command 325 originated from a client 103 which may not have direct access to the server's file system.

To further illustrate the operations of the file extension overload management system 101, a specific example is described in which the link operation is overloaded with the file snapshot command 325. The file snapshot command 325 creates a copy of a file which shares the same data on disk as the original file. Under conventional NFS, a user would need to have direct access to the server 105 in order to create a snapshot of a file being served by NFS. For the purposes of this example, suppose that under a given file system, the snapshot command 325 takes the syntax "# filesnap src dest", which creates a file "dest" that is a snapshot of the existing file "src". It is to be understood that the specific syntax for the file snapshot command 325 can vary between file systems.

In any case, the file extension overload management system 101 could use an identifiable filename extension 301 to overload an operation supported by NFS to execute the snapshot command 325. As noted above, in this example, the link operation is described. The link operation is supported by NFS, and takes two parameters: a source file and the name of the destination. The link operation can take the syntax "# ln src dest" (as with the snapshot command 325, the exact syntax can vary). The link operation creates a hard link of the existing source ("src"). However, to overload the link operation the destination name parameter 323 ("dest") could have a specific identifiable filename extension 301 appended to it, for example "::snap:". It is to be understood that the specific identifiable filename extension 301 to use can vary between embodiments.

Thus, in this example scenario, to use the overloaded link operation to execute the file snapshot command 325 on the server 105, the user on the client 103 would perform a link operation through NFS using the syntax "# ln SourceName DestinationName::snap:", where SourceName is the name of the existing file on the server 105 to be used as the source for the file snapshot command 325, and DestinationName is the name of the snapshot to be created. The client NFS component 315 proceeds to make a request 317 to the server NFS component 305 to execute the indicated link operation with the parameters 323. The server NFS component 305 processes the request 317, and attempts to execute the link operation, which results in a call being made to the file system driver 303 to perform the underlying link functionality. The filtering module 307 filters the call made to the to the file system driver 303, and the identifying module 309 identifies the identifiable filename extension 301 "::snap:" which is appended to the destination parameter 323 passed to the link operation. The interpreting module 321 interprets the identifiable filename extension 301 "::snap:" as an indication that the call to the link operation is actually a call being made to an overloaded operation. The determining module 311 determines that the specific identifiable filename extension 301 "::snap:" indicates that the link operation is here overloaded with the file snapshot command 325. The removing module 319 removes the identifiable filename extension 301 "::snap:" from the parameter 323 to which it is appended, thereby getting the desired destination filename for the file snapshot command 325. The executing module 313 then executes the file snapshot command 325 with the passed SourceName and DestinationName parameters 323 (with the identifiable filename extension 301 stripped off the destination). In other words, rather than creating a hard link of the source parameter 323, as would be done in the case where the link operator was not overloaded, a file snapshot command 325 is performed and a snapshot of the source parameter 323 is created. Thus, the syntax "# ln src dest::snap:" becomes equivalent to "# filesnap src dest". However, because the link operation is part of the NFS protocol, a user on a client 103 without direct access to the server 105 can use the overloaded link operation with the specific identifiable filename extension 301 to trigger the process. The request 317 to perform the link operation and the parameters 323 are passed through from the client NFS component 315 to the server NFS component 305, and from the server NFS component 305 down to the file system driver 303, without requiring any modification to NFS.

Other operations supported by NFS can be overloaded in a similar manner. Any existing NFS operation that can pass the desired parameters 323 to the file system (and hence to the file extension overload management system 101) can be used for this purpose. For example, to execute a command 325 on the server 105 that operates on a single file, the create operation (for example) can be overloaded. Create is supported by NFS, and takes the name of the file to create as its single parameter 323. Thus, to execute a desired command 325 on the server 105, create could be passed the name of an existing file on the server on which to execute the command 325, with an identifiable filename extension 301 appended to the filename. The identifiable filename extension 301 would then be identified, interpreted and removed as described above. The command 325 indicated by the identifiable filename extension 301 would then be executed on the desired file on the server 105, as identified by the filename parameter 323. Thus, a command 325 acting on a single file under a mounted file system of the form "# somecommand /mnt/file", which would have to be run on the server 105 on which the mounted file system is located, could be run over NFS with the syntax "# create /mnt/file:: somecommand:".

It is to be understood that although the embodiments described above use NFS, in other embodiments the same functionality could be applied in the context of a different network file system protocol.

Figure 4:
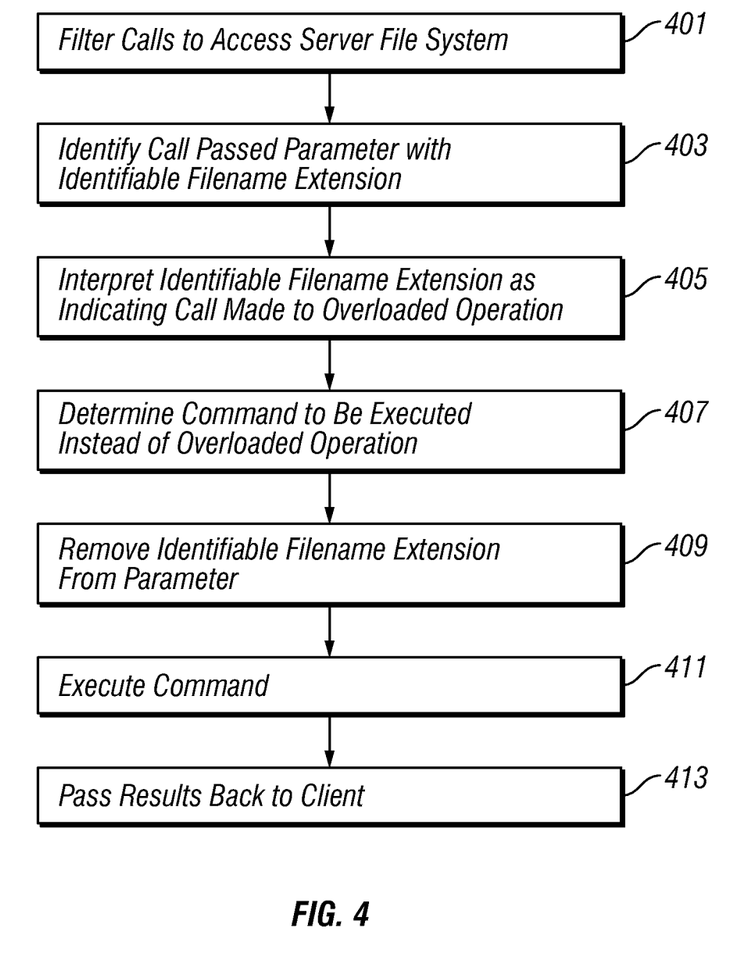
FIG. 4 is a flowchart of the operation of a file extension overload management system, according to some embodiments.

FIG. 4 illustrates steps of the operation of the file extension overload management system 101, according to some embodiments. The filtering module 307 filters 401 calls to access the file system on the server 105 being made available to the client 103 by NFS. The identifying module 309 identifies 403 a call made to access the file system, the call being passed one or more parameters 323, one of which comprises a filename with an identifiable filename extension 301. The interpreting module 321 interprets 405 the identifiable filename extension 301 as indicating that the identified call was made as part of an attempt to execute an operation that is overloaded with a different command 325, such that the different command 325 is to be executed instead of the operation. The determining module 311 determines 407, from the identifiable filename extension 301, which command 325 is to be executed instead of the operation. The removing module 319 removes 409 the identifiable filename extension 301 from the parameter 323 comprising the filename with the identifiable filename extension 301. The executing module 313 then executes 411 the determined command 325 with the one or more parameters 323 passed to the identified call, after the identifiable filename extension 301 has been removed. Finally, the execution module 313 passes 413 results back to the client 103.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for enabling a user on a client without direct access to a server to perform commands on files of a file system on the server, the file system being made available to the client by a network file system protocol, at least a portion of the method being performed by a computing device comprising at least one processor, the method comprising the steps of:
   filtering calls to access the file system on the server being made available to the client by the network file system protocol, wherein filtering calls to access the file system further comprises one step from a group of steps consisting of: filtering calls to access the file system by a component of a file system driver, filtering calls to access the file system by a file system filter driver and intercepting system calls targeting the file system;
   identifying a call made to access the file system, the call being passed at least one parameter, one of the at least one parameter comprising a filename with an identifiable filename extension, wherein the identifiable filename extension comprises a filename extension in the format of the file system, the content of the identifiable filename extension indicating that an operation to which the parameter is being passed is overloaded with a different command;
   interpreting the identifiable filename extension as indicating that the identified call was made as part of an attempt to execute the operation that is overloaded with a different command, such that the different command is to be executed instead of the operation;
   determining, from the identifiable filename extension, which command is to be executed instead of the operation, wherein determining, from the identifiable filename extension, which command is to be executed instead of the operation further comprises: parsing the identifiable filename extension; isolating an identifier of the command to be, executed instead of the operation in the identifiable filename extension; and using the isolated identifier to determine the command to be executed instead of the operation, wherein the content of the identifiable filename extension comprises an identifier of the command to be executed;
   removing the identifiable filename extension from the parameter comprising the filename with the identifiable filename extension; and
   executing the determined command with the at least one parameter passed to the identified call, after the identifiable filename extension has been removed.

2. The method of claim 1 wherein
   the identifier of the command to be executed further comprises a name of the command to be executed.

3. The method of claim 1 wherein:
   the operation that is overloaded and the command that the operation is overloaded with both take the same number of parameters.

4. The method of claim 1 wherein:
   the attempt to execute the operation that is overloaded with a different command originates from the client without direct access to a server.

5. The method of claim 1 further comprising: receiving a request to execute the operation that is overloaded with a different command, by a component of the network file system protocol on the server, from a component of the network file system protocol on the client.

6. The method of claim 1 wherein:
   the network file system protocol making the file system on the server available to the client without direct access to a server comprises Network File System (NFS).

7. At least one non-transitory computer readable medium storing a computer program product for enabling a user on a client without direct access to a server to perform commands on files of a file system on the server, the file system being made available to the client by a network file system protocol, the computer program product comprising:
   program code for filtering calls to access the file system on the server being made available to the client by the network file system protocol, wherein filtering calls to access the file system further comprises one step from a group of steps consisting of: filtering calls to access the file system by a component of a file system driver, filtering calls to access the file system by a file system filter driver and intercepting system calls targeting the file system;
   program code for identifying a call made to access the file system, the call being passed at least one parameters, one of the at least one parameters comprising a filename with an identifiable filename extension, wherein the identifiable filename extension comprises a filename extension in the format of the file system, the content of the identifiable filename extension indicating that an operation to which the parameter is being passed is overloaded with a different command;
   program code for interpreting the identifiable filename extension as indicating that the identified call was made as part of an attempt to execute the operation that is overloaded with a different command, such that the different command is to be executed instead of the operation;
   program code for determining, from the identifiable filename extension, which command is to be executed instead of the operation, wherein determining, from the identifiable filename extension, which command is to be executed instead of the operation further comprises: parsing the identifiable filename extension; isolating an identifier of the command to be executed instead of the operation in the identifiable filename extension; and using the isolated identifier to determine the command to be executed instead of the operation, wherein the content of the identifiable filename extension comprises an identifier of the command to be executed;
   program code for removing the identifiable filename extension from the parameter comprising the filename with the identifiable filename extension; and program code for executing the determined command with the at least one parameter passed to the identified call, after the identifiable filename extension has been removed.

8. The computer program product of claim 7 wherein the identifier of the command to be executed further comprises a name of the command to be executed.

9. The computer program product of claim 7 wherein: the operation that is overloaded and the command that the operation is overloaded with both take the same number of parameters.

10. The computer program product of claim 7 wherein: the attempt to execute the operation that is overloaded with a different command originates from the client without direct access to a server.

11. The computer program product of claim 7 further comprising:
program code for receiving a request to execute the operation that is overloaded with a different command, by a component of the network file system protocol on the server, from a component of the network file system protocol on the client.

12. The computer program product of claim 7 wherein: the network file system protocol making the file system on the server available to the client without direct access to a server comprises Network File System (NFS).

13. A computer system for enabling a user on a client without direct access to a server to perform commands on files of a file system on the server, the file system being made available to the client by a network file system protocol, the computer system comprising:
at least one processor;
a computer memory;
a filtering module residing in the computer memory, the filtering module being configured to filter calls to access the file system on the server being made available to the client by the network file system protocol, wherein filtering calls to access the file system further comprises one step from a group of steps consisting of: filtering calls to access the file system by a component of a file system driver, filtering calls to access the file system by a file system filter driver and intercepting system calls targeting the file system;
an identifying module residing in the computer memory, the identifying module being configured to identify a call made to access the file system, the call being passed at least one parameters, one of the at least one parameters comprising a filename with an identifiable filename extension, wherein the identifiable filename extension comprises a filename extension in the format of the file system, the content of the identifiable filename extension indicating that an operation to which the parameter is being passed is overloaded with a different command;
an interpreting module residing in the computer memory, the interpreting module being configured to interpret the identifiable filename extension as indicating that the identified call was made as part of an attempt to execute the operation that is overloaded with a different command, such that the different command is to be executed instead of the operation;
a determining module residing in the computer memory, the determining module being configured to determine, from the identifiable filename extension, which command is to be executed instead of the operation, wherein determining, from the identifiable filename extension, which command is to be executed instead of the operation further comprises: parsing the identifiable filename extension; isolating an identifier of the command to be executed instead of the operation in the identifiable filename extension; and using the isolated identifier to determine the command to be executed instead of the operation, wherein the content of the identifiable filename extension comprises an identifier of the command to be executed;
a removing module residing in the computer memory, the removing module being configured to remove the identifiable filename extension from the parameter comprising the filename with the identifiable filename extension; and
an executing module residing in the computer memory, the executing module being configured to execute the determined command with the at least one parameters passed to the identified call, after the identifiable filename extension has been removed.

14. The computer system of claim 13 wherein: the identifier of the command to be executed further comprises a name of the command to be executed.

15. The computer system of claim 14 wherein: the operation that is overloaded and the command that the operation is overloaded with both take the same number of parameters.

16. The computer system of claim 14 wherein: the attempt to execute the operation that is overloaded with a different command originates from the client without direct access to a server.

17. The computer system of claim 14 further comprising: a component of the network file system protocol on the server, configured to receive a request to execute the operation that is overloaded with a different command, from a component of the network file system protocol on the client.

18. The computer system of claim 14 wherein: the network file system protocol making the file system on the server available to the client without direct access to a server comprises Network File System (NFS).

* * * * *